United States Patent
Sicz et al.

(10) Patent No.: US 7,025,522 B2
(45) Date of Patent: Apr. 11, 2006

(54) ADJUSTABLE BICYCLE SEAT POST ASSEMBLY

(76) Inventors: Wayne Sicz, 612 5th Ave. E., Polson, MT (US) 59860; Arlen Wisseman, 100 Wisseman La., Polson, MT (US) 59860

( * ) Notice: Subject to any disclaimer, the term of this patent is extended or adjusted under 35 U.S.C. 154(b) by 0 days.

(21) Appl. No.: 10/823,464

(22) Filed: Apr. 13, 2004

(65) Prior Publication Data

US 2004/0208687 A1    Oct. 21, 2004

Related U.S. Application Data

(60) Provisional application No. 60/463,986, filed on Apr. 18, 2003.

(51) Int. Cl.
*B62J 1/08* (2006.01)
*B62K 19/36* (2006.01)

(52) U.S. Cl. ............... 403/109.2; 403/109.1; 403/109.6; 403/109.7; 403/378; 403/379.5; 403/DIG. 1; 248/188.5; 248/408; 297/215.13

(58) Field of Classification Search .......... 403/DIG. 1, 403/109.6–109.8, 109.1, 109.3, 377, 378, 403/379.5; 248/188.5, 407, 408, 599; 292/207, 292/251.5; 297/215.13
See application file for complete search history.

(56) References Cited

U.S. PATENT DOCUMENTS

| | | | |
|---|---|---|---|
| 510,993 A | 12/1893 | Riess | |
| 578,011 A | 3/1897 | Girardet | |
| 3,596,958 A * | 8/1971 | Bowerman | 403/108 |
| 4,113,221 A | 9/1978 | Wehner | |
| 4,150,851 A | 4/1979 | Cienfuegos | |
| 4,919,464 A | 4/1990 | Richards | |
| 5,044,592 A | 9/1991 | Cienfuegos | |
| 5,061,112 A | 10/1991 | Monford, Jr. | |
| 5,271,253 A * | 12/1993 | Cassada et al. | 292/251.5 |
| 5,660,495 A | 8/1997 | Atsukawa | |
| 5,713,555 A * | 2/1998 | Zurfluh et al. | 248/599 |
| 6,202,971 B1 | 3/2001 | Duncan | |
| 6,354,557 B1 | 3/2002 | Walsh | |
| 6,478,278 B1 | 11/2002 | Duncan | |
| 6,585,215 B1 | 7/2003 | Duncan | |
| 6,631,947 B1 | 10/2003 | Faltings | |
| 6,640,398 B1 | 11/2003 | Hoffman | |
| 2002/0185581 A1 | 12/2002 | Trask | |

FOREIGN PATENT DOCUMENTS

| | | |
|---|---|---|
| EP | 0 148 979 | 5/1990 |
| GB | 2 116 128 A | 9/1983 |
| JP | 4-362482 | 12/1992 |

* cited by examiner

*Primary Examiner*—Daniel P. Stodola
*Assistant Examiner*—Ernesto Garcia
(74) *Attorney, Agent, or Firm*—Jon E. Shackelford

(57) ABSTRACT

An adjustable height bicycle seat post assembly comprises a hollow seat post for supporting a bicycle seat slidably supported on plastic shims inside a hollow tube. The hollow tube clamps into the frame of a bicycle. A main spring forces the post upward, but a locking mechanism interconnects the post with the tube in various fixed positions relative to the tube. The locking mechanism includes a foundation and a projection extending from the foundation having a counter-bore for guiding a plunger into holes on the post. The locking mechanism adheres to the outside of the tube to bear shearing forces on the plunger. An endcap on the locking mechanism and a top cap on the tube protect the assembly from foreign debris. The locking mechanism may be manipulated remotely using a magnetic switch assembly or manually using a manual assembly.

8 Claims, 8 Drawing Sheets

FIG - 3
FIG - 4
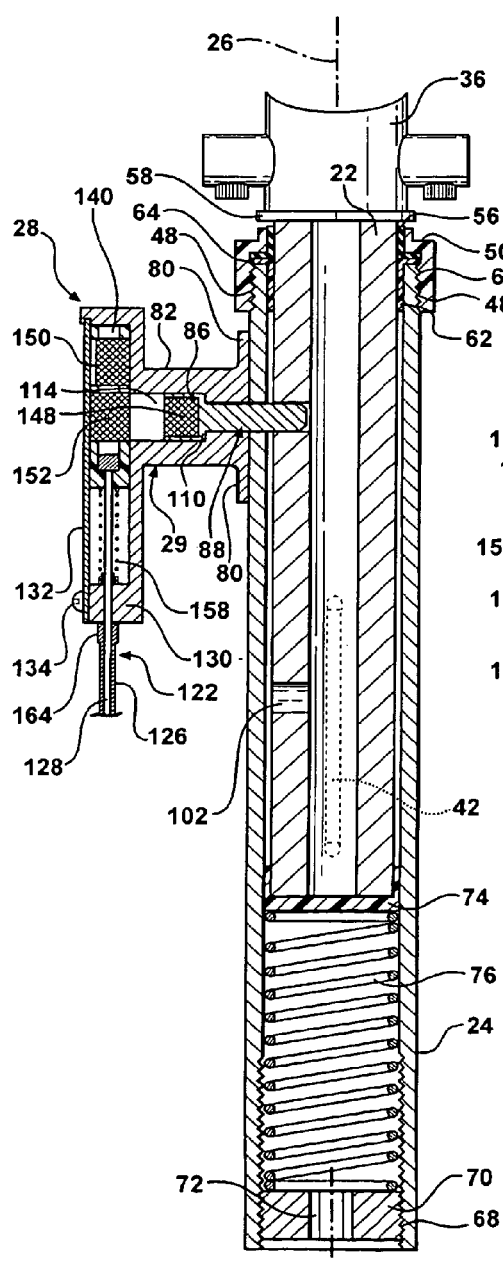
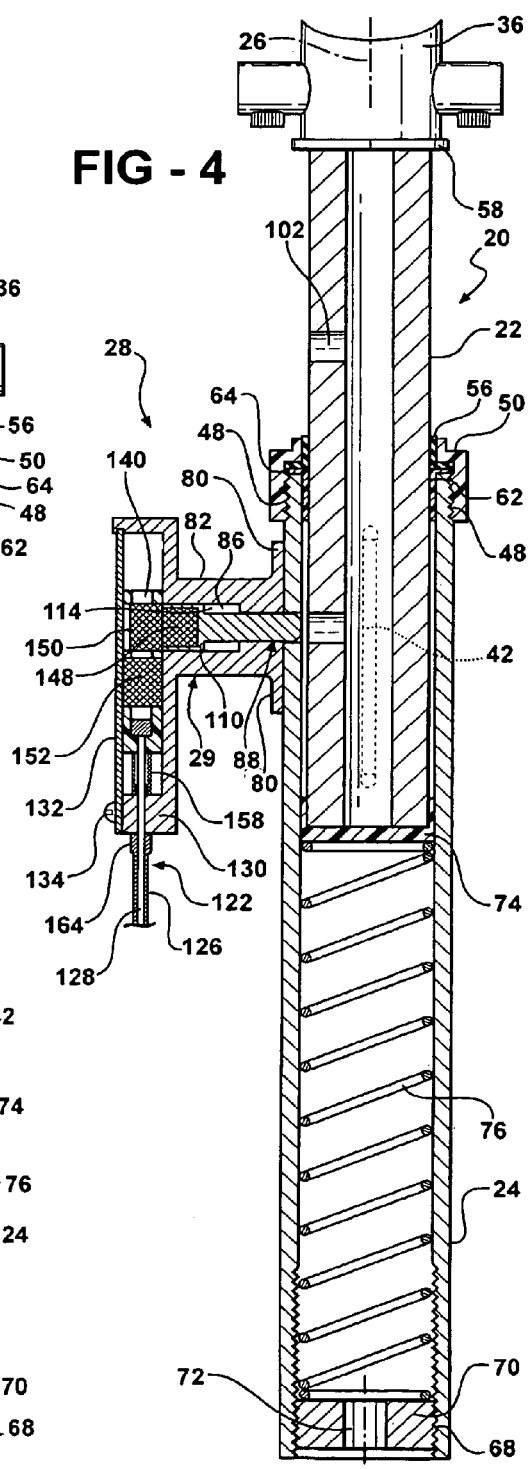

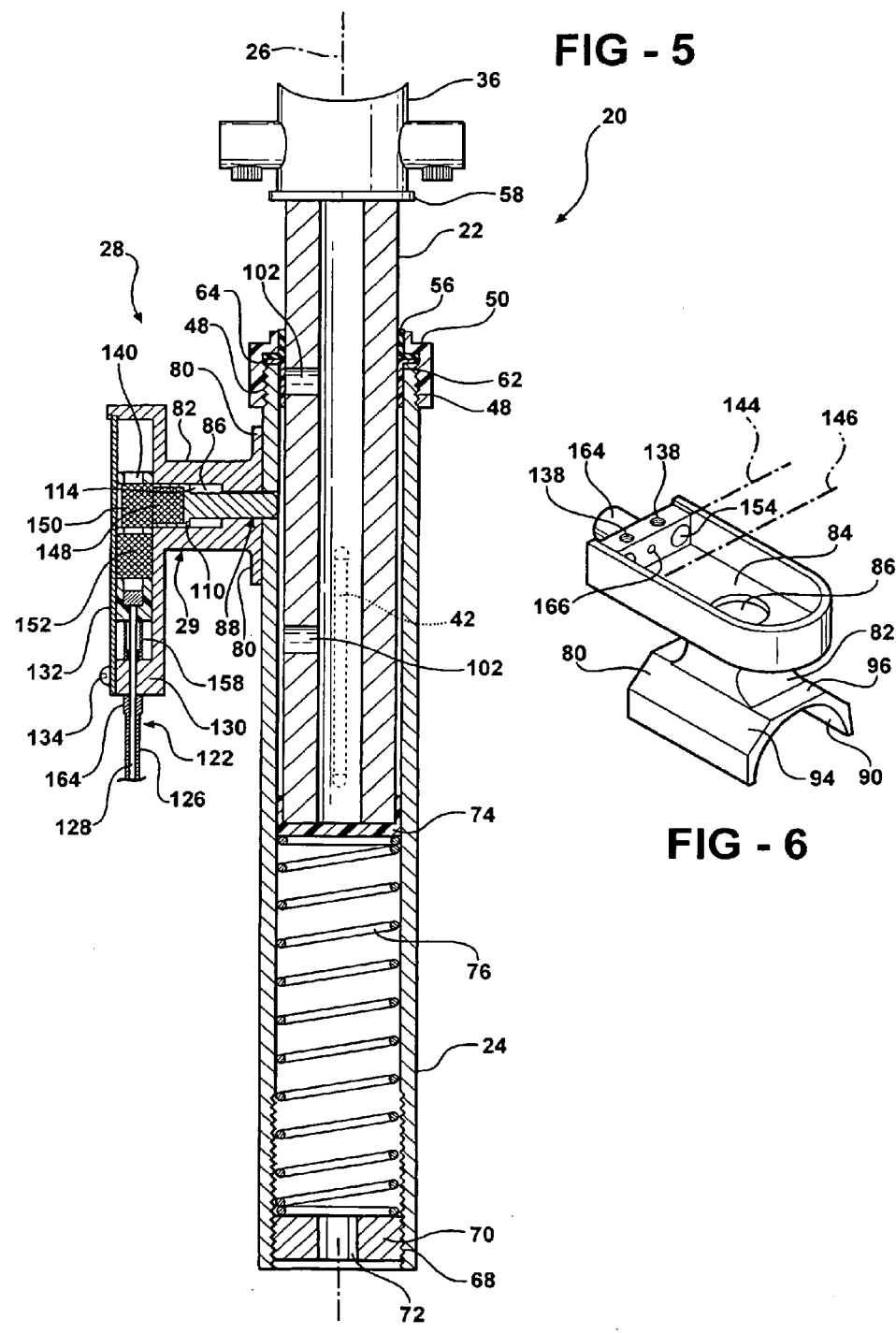

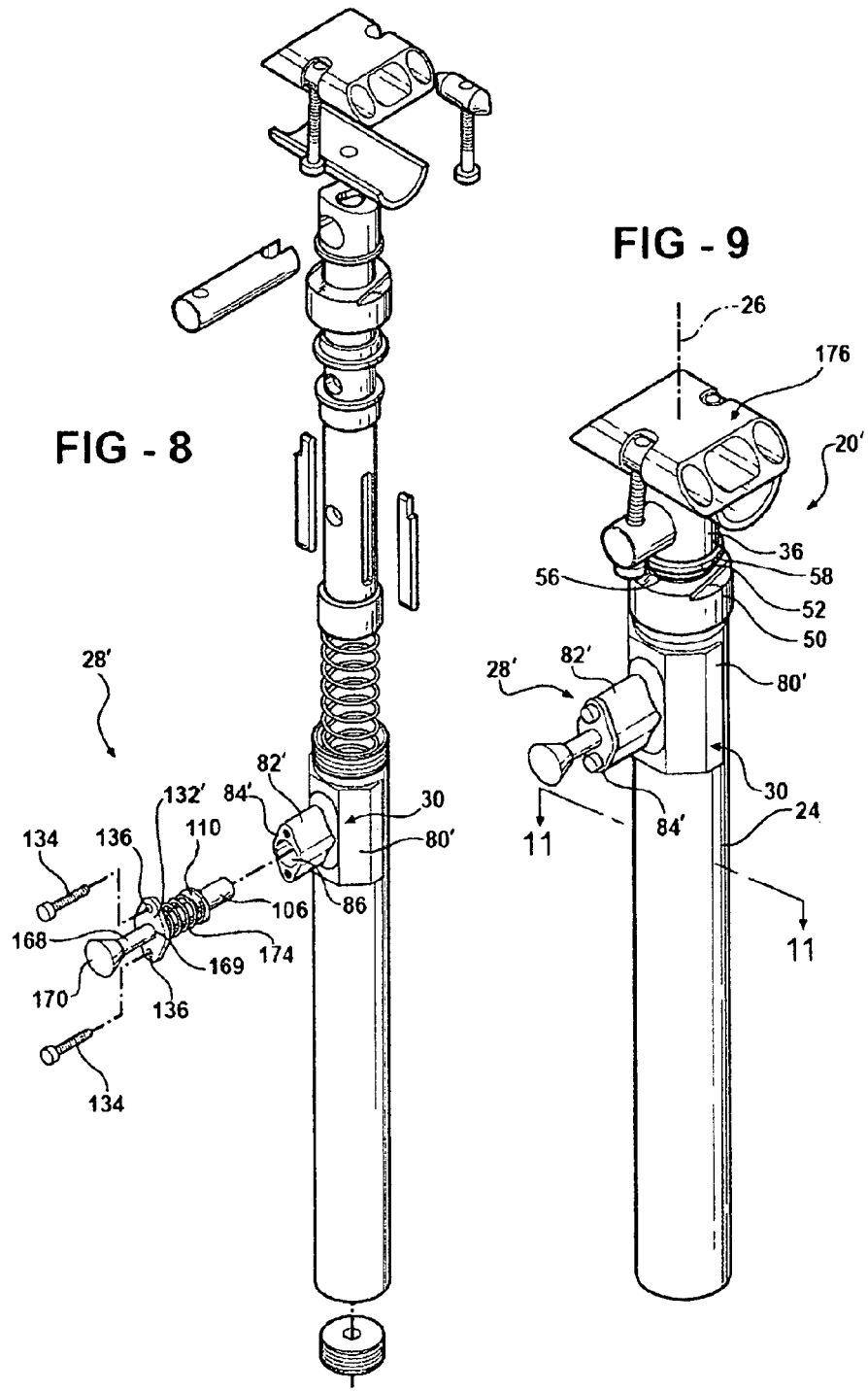

ADJUSTABLE BICYCLE SEAT POST ASSEMBLY

This application claims the benefit of provision application No. 60/463,986, filed Apr. 18, 2003.

BACKGROUND OF THE INVENTION

1. Field of the Invention

The invention relates generally to adjustable bicycle seat posts, and more particularly to a sliding seat post within a post that allows a bicycle seat to be adjusted while a bicycle is being ridden.

2. Description of the Related Art

For those engaged in competitive cycling, such as the sport of mountain biking, it is sometimes advantageous to adjust the position of the body while riding in order to optimize the control and power over the bike. For instance, when descending a steep hill, a rider sometimes will drop back behind the bicycle seat in order to lower the body position and thereby gain more control over the bike. At most other times, such as on flat terrain, it is most advantageous for the rider to be seated on the bicycle seat in order to achieve optimum pedal power.

Another challenge faced by competitive mountain bikers is that the various components of the bike are subjected to exposure to water, mud, dirt and other debris which can quickly impair the proper operation of various moving parts.

Various adjustable-height bicycle posts have been proposed which enable a user to vary the height of the seat between two or more positions while riding. The posts are typically in the form of a telescoping tube structure that is mounted at it lower end one end in the receptacle of a bicycle frame in place of a conventional one-piece fixed length bicycle post, and which carries a seat at its opposite upper end. Some form of a locking mechanism is provided which selectively locks the tubes in one of two or more positions. In some cases, a spring is provided which acts to constantly bias the tubes toward an extended condition.

None of the adjustable seat post configurations presently known to the inventors is believed to be satisfactory to withstand the rigors of competitive mountain biking. It is believed that the latching mechanisms are too weak to withstand the constant pounding they would encounter while supporting the weight of the rider over rough terrain. Moreover, some of the locking mechanisms are external and others, while at least in part internal, are insufficiently protected against the intrusion of dirt, mud, water and other debris that would be certain to disable the operation of the locking mechanisms in short order. There is further the general inability to readily disassemble the locking mechanism and other moving components in order to clean the dirt and debris out of the assembly to restore proper operation in the event the assembly is fouled.

It is an object of the present invention to overcome or greatly minimize the forgoing disadvantages of prior adjustable bicycle seat post assemblies.

SUMMARY OF THE INVENTION AND ADVANTAGES

The invention provides an adjustable bicycle seat post assembly comprising an inner tube telescopically supported within an outer tube. A lower end of the outer tube is dimensioned to be received in a receptacle of a bicycle frame in order to mount the outer tube firmly to the bicycle frame. The inner tube is slidable relative to the outer tube in order to adjust the effective length of the telescopic tubes. The outer tube houses a spring which acts between the outer and inner tubes and constantly biases the inner tube toward an extended condition. A locking mechanism is fixed to the outer tube and includes a locking pin which extends through an opening in the outer tube. The inner tube has at least two longitudinally spaced openings that are selectively alignable with the opening of the outer tube during movement of the inner tube relative to the outer tube. When so aligned, the locking pin is extendable into the opening of the inner tube in order to lock the inner tube against longitudinal movement relative to the outer tube against the force of the spring. The portion of the pin extending into the inner tube opening is fully supported to its inner distal end by the wall of the inner tube opening. The portion of the pin extending through the outer tube opening is likewise fully supported and is further supported by a wall of a housing of the locking mechanism projecting radially outwardly of the outer tube.

Such full support of the locking pin by the inner and outer tubes as well as the reinforced housing provides robust support to the tubes sufficient to withstand the constant pounding and shear force that the pin is subjected to during competitive use. The hollow tubular structure reduces the weight of the structure.

According to another aspect of the invention, the locking mechanism is able to be readily disassembled to allow for cleaning of the mechanism in the event dirt and other debris enter the mechanism.

According to a further aspect of the invention, an adjustable height tube-in-a-tube bicycle post assembly is provided having a spring which constantly acts to extend the tubes and a magnetic locking mechanism. The locking mechanism has a set of magnets which act to selectively move a locking pin and thereby extend or retract the pin. When retracted, the inner tube is freely slidable relative to the outer tube. When extended, the pin is positionable into alignable openings of the inner and outer tubes to thereby lock the tubes against relative movement. The magnetic locking mechanism provided a very simple, reliable, robust means of quickly and efficiently locking and unlocking the tubes on the fly.

According to a further aspect, the invention contemplates that the magnetic locking mechanism can be used in conjunction with other than adjustable bicycle seat posts. The magnetic locking mechanism per se comprises a housing supporting a slidable locking pin and housing a set of oppositely polarized magnets. The magnets are supported by a slide shoe which is slidable relative to the housing and which selectively moves one or the other of the magnets into position to either repel or attract the locking pin, causing the pin to slidably extend or retract relative to the housing. Such a magnetic locking mechanism is simply constructed, is comprised of few parts, and is very effective in operating the movement of the pin.

THE DRAWINGS

These and other features and advantages of the present invention will become more readily appreciated when considered in connection with the following detailed description and appended drawings, wherein:

FIG. 3 is an enlarged cross-sectional view of the assembly shown in the lowered position;

FIG. 4 is a view like FIG. 3, but shown in the raised position;

FIG. 5 is a view like FIGS. 3 and 4, but shown in an intermediate position;

FIG. 6 is a perspective view of the locking mechanism housing;

FIG. 8 is an exploded perspective view of an assembly according to a second embodiment of the invention;

FIG. 9 is a perspective view of the assembly of FIG. 8 shown in a lowered position;

DETAILED DESCRPTION

Referring to the Figures, wherein like numerals indicate like parts throughout the several views, an adjustable bicycle seat assembly is shown generally at 20.

Figure 1:
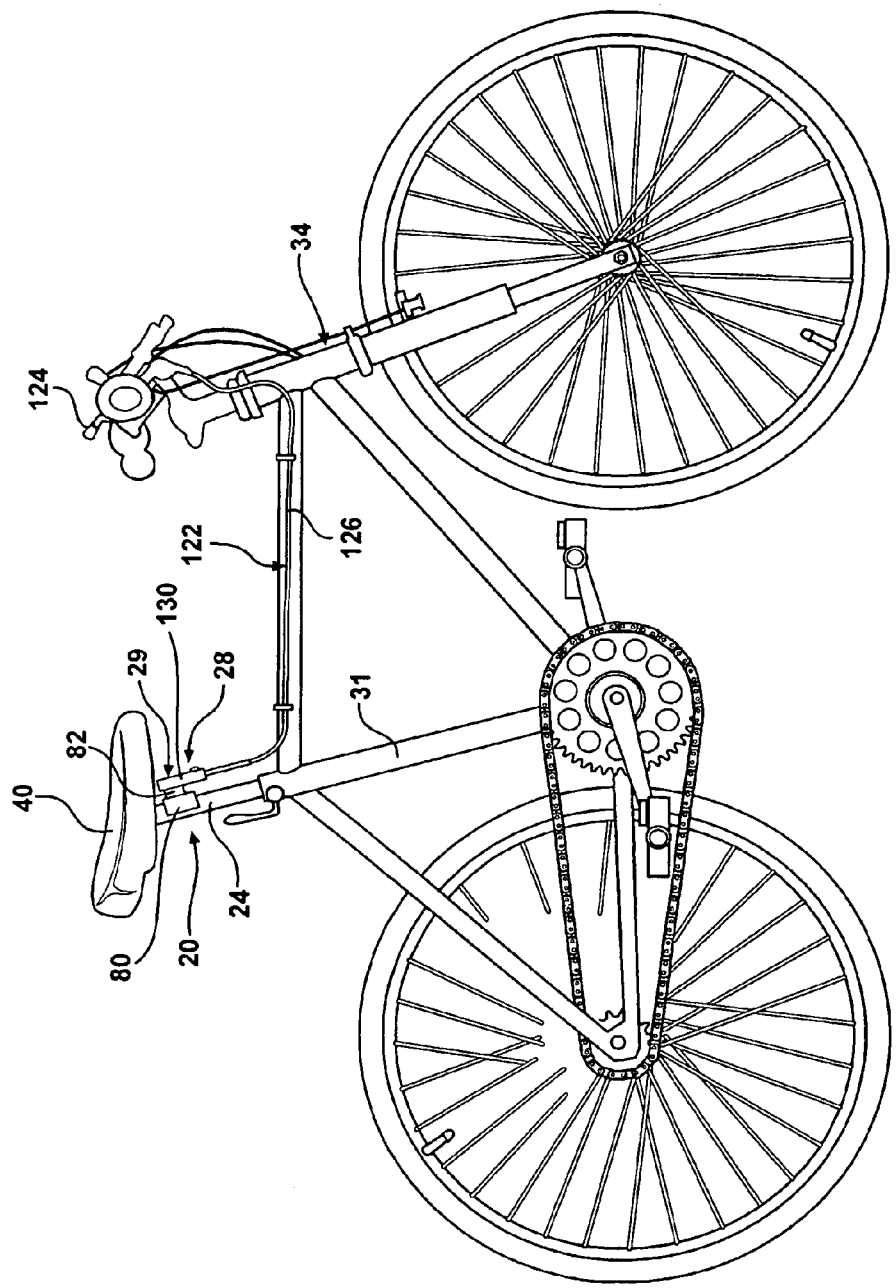
FIG. 1 is a schematic view of a bicycle having the adjustable seat post mounted thereon.

Referring now to FIG. 1, the seat post assembly 20 comprises a hollow inner seat post or tube 22 that slides inside a hollow outer tube 24 along a longitudinal axis 26, and a locking mechanism 28 interconnecting the post 22 in various adjustable positions relative to the tube 24. The locking mechanism 28 may be manipulated through various means to engage or release the post 22, as described in more detail below. There are two alternative representative embodiments of locking assemblies according to the invention, one remote actuated magnetic switch assembly 29 as shown in FIGS. 1–7 and the other a manual release assembly 30 as shown in FIGS. 8–16. Their respective constructions and operations will be described below.

Preferably, the outer tube 24 is fabricated of a lightweight corrosion-resistant metal having thin walls, and the post 22 is composed of a lightweight metal having thicker walls than that of the outer tube 24. The preferred material for the inner and outer tubes 22, 24 is aluminum or an aluminum alloy, although the invention is not to be limited by these materials.

Referring now additionally to FIGS. 2–5, the outer tube 24 is configured at its lower end to be slidably received in a conventional seat post receptacle in the frame 31 of a bicycle 34 in the usual manner of a conventional, single-tube bicycle seat post 22. The opposite upper end of the inner tube 22 is fitted with a bracket 36 suitable for mounting a bicycle seat or saddle 40 to support the weight of a rider.

Figure 2:
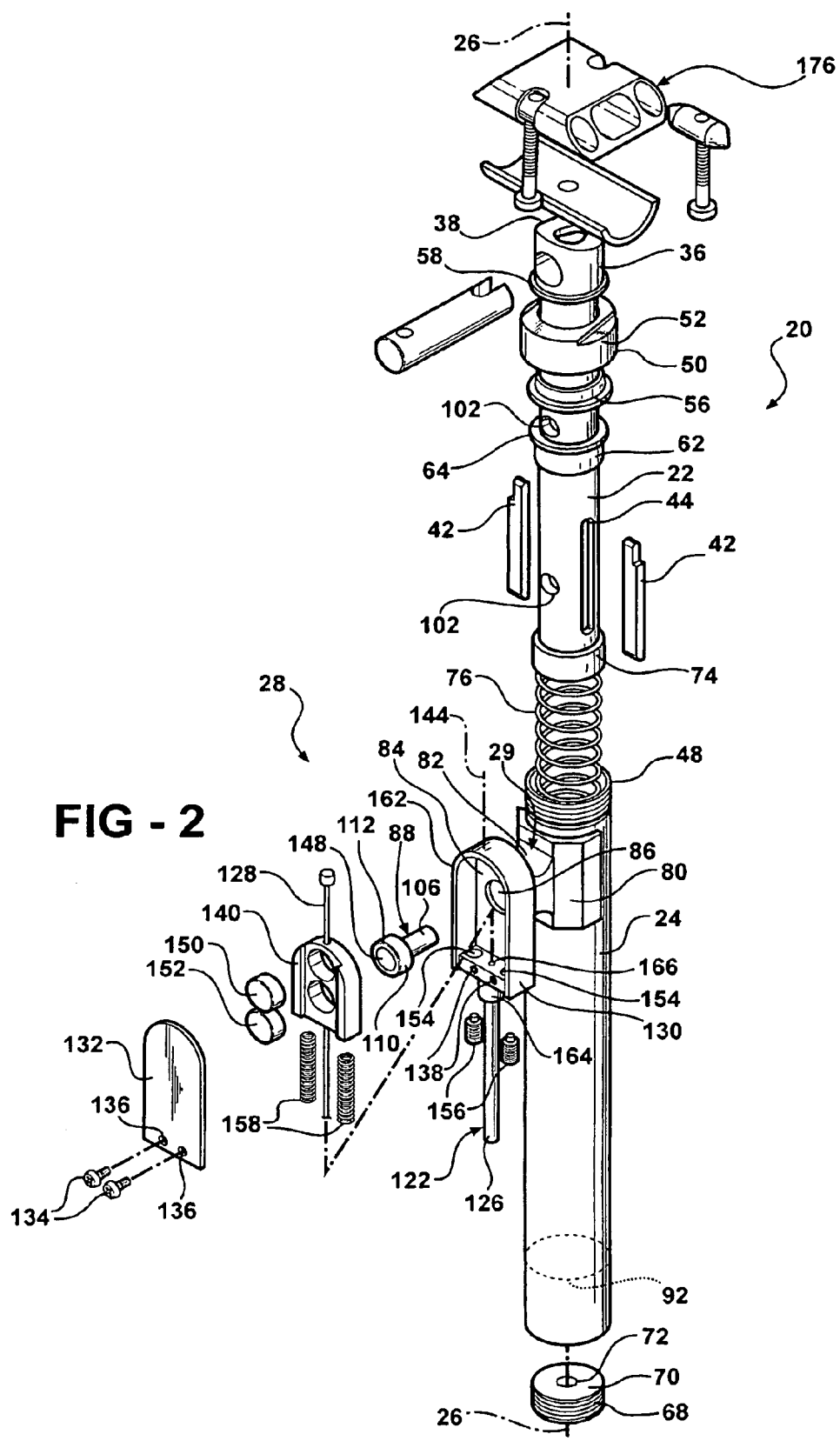
FIG. 2 is an exploded view of a first embodiment of the adjustable seat post assembly.
Figure 11:
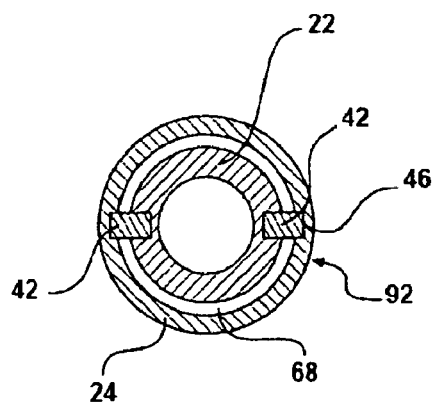
FIG. 11 is a sectional view taken generally along lines 11—11 of FIG. 9.
Figure 12:
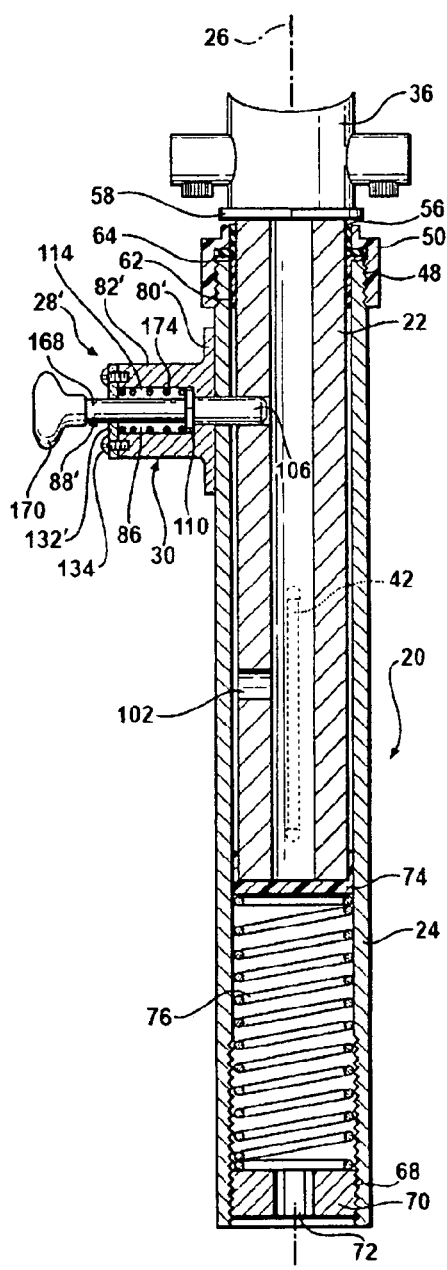
FIG. 12 is an enlarged cross-sectional view of the assembly of FIG. 9.
Figure 13:
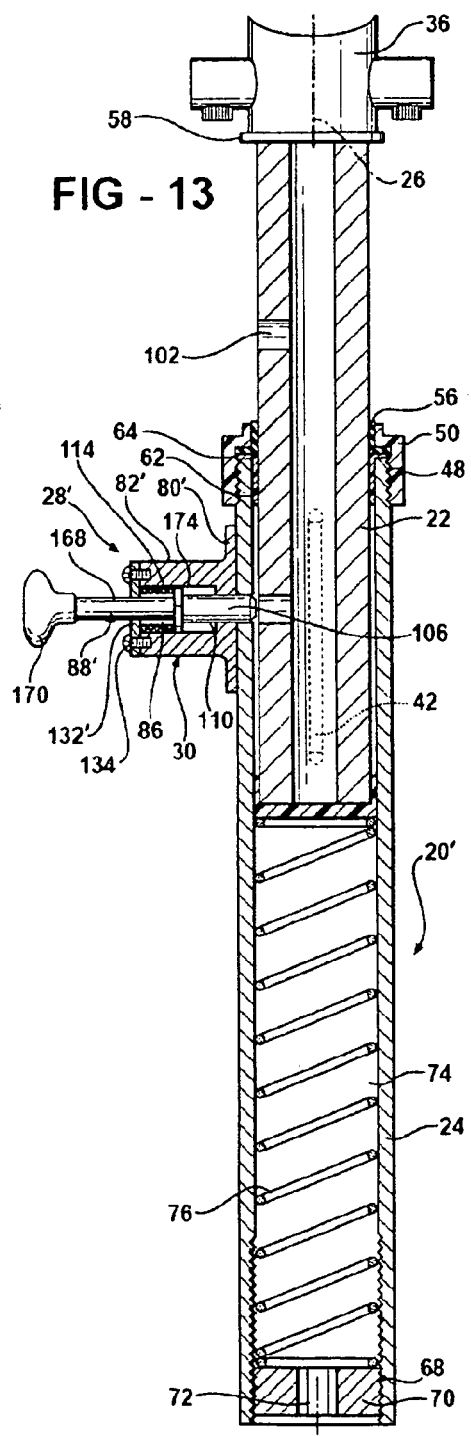
FIG. 13 is a view like FIG. 12, but shown in the raised position.

As best shown in FIGS. 2 and 11, a pair of shims 42, preferably fabricated of plastic, are removably inserted into notches 44 on the inner post 22 to glide in vertical grooves 46 located inside the outer tube 24 along the longitudinal axis 26. The shims 42 allow the post 22 to move up or down relative to the outer tube 24, but support the inner post 22 post against rotational movement relative to the outer tube 24. After a period of use and wear, the plastic shims 42 may be inexpensively replaced to prolong the life-span of the bicycle seat assembly 20.

A top ring cap 50 is carried about an extended portion of the inner post 22 that extends above the outer tube 24 and is threadable onto the outside of the upper end of the outer tube 24 to provide a serviceable connection between the tubes 22, 24 that prevents them from separating from one another during normal use, but yet enables a user to dissemble the tubes in order to clean the interior or replace worn or broken components as the need arises. The ring cap 50 forms a water and debris-tight seal with the outer tube 24 and further has a hole 52 through which the post 22 extends presenting an annular wiping lip that rides against the inner post 22 and which preferably provides a water and debris-resistant ring seal about the relatively slidable inner post 22 to discourage the entry into the inner tube 24. Preferably, the top ring cap 50 is fabricated of a lightweight plastics material, such as nylon or the like. An O-ring seal 56 is also preferably disposed about the post 22 below the top cap 50 to enhance the sealing characteristics of the top ring cap 50.

A seat clamp collar 58 integral with the post 22 is located at the bottom of the seat clamp mount 36 and defines a collar diameter greater than the diameter of the top cap central hole 52. The collar 36 defines a stop surface or shoulder for the inner post 22 which confronts the top ring cap 50 when the inner post is in a fully distended or retracted position. The top ring cap 50 thus serves to not only couple the inner and outer tubes 22, 24 but to limit their travel to define fully extended and retracted positions of the tubes 22, 24. Additionally, a bushing or sleeve 62, which is preferably fabricated of a plastics material such as nylon or the like, is disposed about the post 22 between the shims 42 and top cap 50. A body of the sleeve 62 extends into the outer tube 24 through its open top and serves as a bearing to take up the annular operating clearance between the inner and outer tubes 22, 24. A top flange 64 of the sleeve 62 is captured between the top ring cap 50 and the top end of the outer tube 24 to support the sleeve 62 in position. When in the fully extended position, the shims 42 of the inner post 22 preferably contact the body of the sleeve 62 to effectively limit the outward travel of the inner post 22 relative to the outer tube 24. The sleeve 62 is readily removable from the outer tube 24 during disassembly to accommodate cleaning and/or servicing of the assembly as needed.

The bottom end of the outer tube 24 is open and is closed by a removable end cap 70. Preferably, the lower end of the outer tube 24 is internally threaded and the end cap 70 is externally threaded. The end cap 70 is threaded into the outer tube 24 to close the lower end, but yet the end cap 70 remains separable to allow access to the bottom of the post 22. The bottom cap nut 70 is preferably fabricated of a lightweight metal compatible with that of the outer tube material to minimize corrosion, such as aluminum or aluminum alloys, and includes a hex shaped tool-receiving recess 72 for receiving a wrench for tightening and loosening the end cap 70. The end cap 70 supports the lower end of a main compression spring 76 housed within the outer tube 24. The upper end of the spring 76 abuts a shoulder or collar 74 provided on the inner post 22 adjacent its lower end. The spring 76 acts in compression between the end cap 70 and the shoulder 74 to exert a recoil spring force that constantly urges the inner post 22 longitudinally outwardly of the outer tube 24 toward the fully extended position. The main spring 76 force (spring rate) can be adjusted by threading the bottom cap nut 70 toward or away from the shoulder 74.

Figure 7:
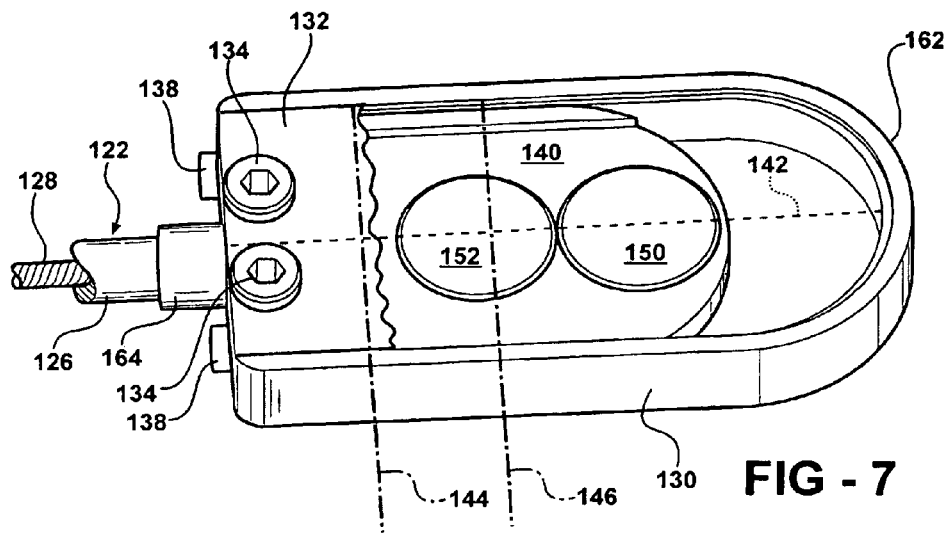
FIG. 7 is an enlarged fragmentary perspective view of the magnetic latch mechanism.
Figure 14:
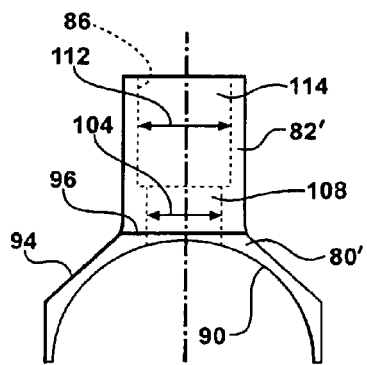
FIG. 14 is a side view of the latch housing.
Figure 15:
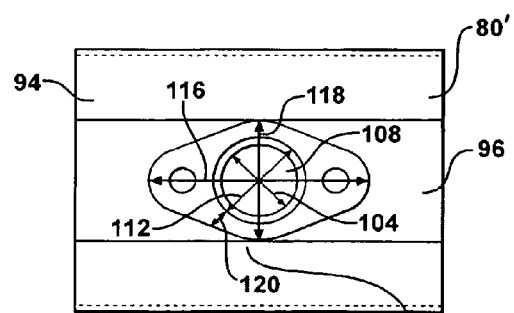
FIG. 15 is a plan view of the latch housing.
Figure 16:
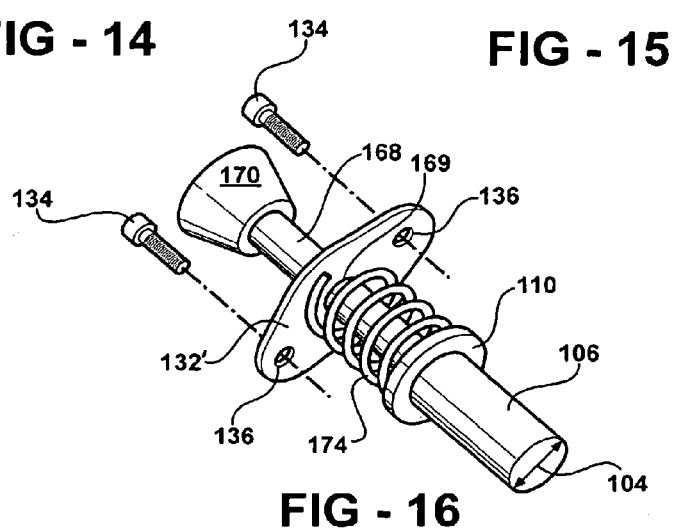
FIG. 16 is a partially exploded perspective view of the manual latch mechanism.
Figure 10:
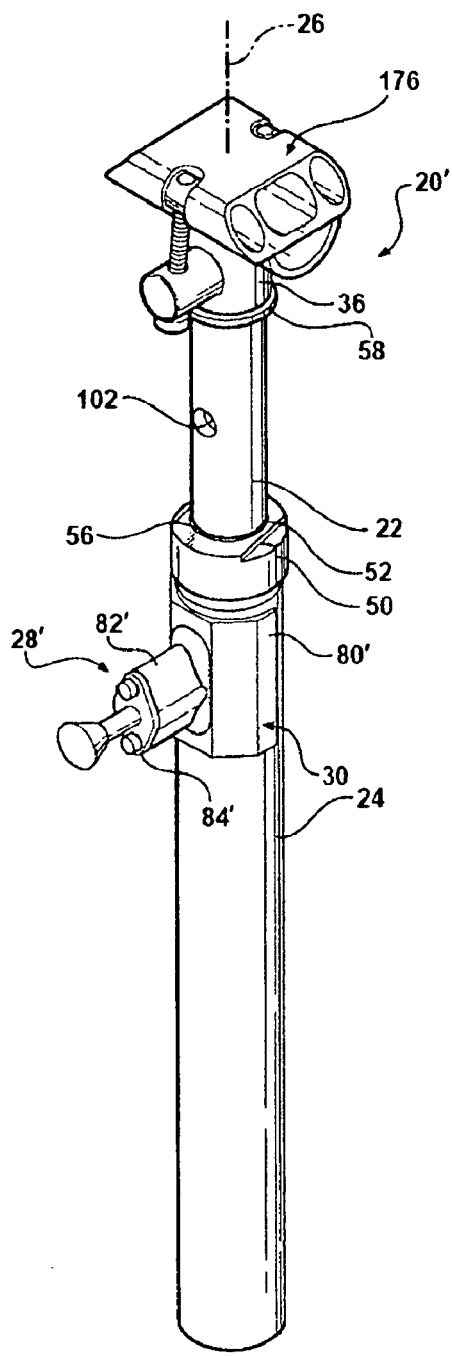
FIG. 10 is a view like FIG. 9, but shown in the raised poisiton.

Referring now to FIGS. 6 and 7, the locking mechanism 28 includes a foundation or housing 80 disposed on the outside of the tube 24 and a projection portion 82 integral with the foundation 80 extending radially from the longitudinal axis 26 to a distal end 84. A counterbore 86 defined in the projection 82 extends perpendicularly to the longitudinal axis 26 and slidably supports a locking pin or plunger 88.

The foundation 80 includes a concave part-cylindrical bottom surface 90 corresponding in size and shape to the outer surface 92 of the outer tube 24. The bottom surface 90 extends less than 180 degrees about the circumference 92 of the tube 24, allowing the bottom surface 90 to be pressed against the outer tube 24 and adhesively secured. The foundation 80 also includes an outer surface 94 opposite to the bottom surface 90. This outer surface 94 includes at least one flat outer surface 96 extending tangentially to the circular bottom surface 90. A cross section of this outer surface 94 preferably defines a polygon segment of flat surfaces, such as one half of an octagon as shown in FIG. 6. Preferably, the projection 82 extends laterally from a centrally located flat surface 96 on the foundation 80.

A plurality of holes 102 located on the post 22 have a force-bearing diameter 104 for receiving the plunger 88 and holding the post 22 in a fixed position relative to the hollow tube 24. The plunger 88 has a force-bearing section 106 that is slidably supported by a force-bearing length 108 of counterbore 86 within the projection 82 and foundation 80. This force-bearing section 106 of plunger 88 is fully supported along the entire force-bearing length 108 of counterbore 86 when the plunger 88 engages the holes 102 in the post 22. In addition to the force-bearing section 106, the plunger 88 includes a disk 110 extending radially from the plunger 88. The disk 110 has a disk diameter 112 greater than the force-bearing diameter 104 and is slidably supported inside the counterbore 86 by a disk-bearing length 114 of counterbore 86.

The projection 82 defines a height 116 along the longitudinal axis 26, and a width 118 perpendicular to the height 116. Preferably, the height 116 is greater than the width 118. The projection 82 also defines a wall thickness 120 surrounding the counterbore 86. Preferably the wall thickness 120 is greater in the direction of the height 116 than in the direction of the width 118, making the projection 82 strongest along the longitudinal axis 26 to bear the shearing forces on the plunger 88 while keeping the projection 82 dimensions small.

In the remote controlled magnetic switch assembly 29 shown in FIGS. 1–7, the plunger 88 is preferably manipulated via a push-pull cable 122 connected to a remote thumbswitch 124. The push-pull cable 122 is of the type commonly used in bicycles, with an outer sheath 126 that movably supports an inner control cable 128. A housing 130 is integral with the distal end 84 of the projection 82 and covered by a main unit endcap 132. The endcap 132 is secured to the housing 130 by two cap screws 134 that extend through endcap holes 136 in the endcap 132 and thread into cap screw holes 138.

A slider bar or slider shoe 140 is disposed in the housing 130, below the endcap 132 and above the plunger 88, for sliding movement inside the housing 130 along a slider axis 142 between a first position 144 and a second position 126. The disk 110 section of the plunger 88 includes a plunger magnet 148 having a plunger magnetic polarity facing the slider bar 140. The slider bar 140 includes an attracting magnet 150 having an attracting magnetic polarity opposite to the plunger magnetic polarity. The attracting magnet 150 is embedded in the slider bar 140 to be centered over the plunger magnet 148 when the slider bar 140 is in the first position 144, thereby disengaging the plunger 88 from the post 22 when the slider bar 140 is in the first position 144.

Preferably, the first position 144 is defined when the slider bar's motion along the slider axis 142 is checked by contact with the housing 130. The slider bar 140 also includes a repelling magnet 152 having a repelling magnetic polarity matching the plunger magnetic polarity. The repelling magnet 152 is embedded in the slider bar 140 to be centered over the plunger magnet 148 when the slider bar 140 is in the second position 126, thereby engaging the plunger 88 with the post 22 when the slider bar 140 is in the second position 126. Preferably, the second position 126 is defined when the slider bar's motion along the slider axis 142 is checked by contact with the housing 130 at the end of the slider axis 142 opposite to the first position 144.

The housing 130 includes a pair of threaded screw holes 154 in the direction of the slider axis 142 and tension set screws 156 threaded into these screw holes 154. A pair of slider bar springs 158 fit into a pair of spring holes 160 disposed on the slider bar 140 and mesh with the tension set screws 156 in the housing 130. The slider bar springs 158 force the slider bar 140 into the second position 126. Additionally, the housing 130 and slider bar 140 have a rounded shape 162 opposite to the slider bar springs 158 to ensure that the slider bar 140 rests snugly when forced into the second position 126 by the slider bar springs 158.

A cable mount 164 disposed outside the housing 130 holds the cable's 122 outer sheath 126 against the housing 130 in a fixed position. The cable mount 164 is located on the same side of the housing 130 as the tension set screws 156 along the slider axis 142, and the cable 122 extends parallel to the longitudinal axis 26 near the cable mount 164. The inner control cable 128 extends through a cable hole 166 in the housing 130 and connects to the slider bar 140 for moving the slider bar 140 in proportion to the pressure applied to the thumbswitch 124. In this first embodiment, the thumbswitch 124 counteracts the force of the tension set screws 156 to move the slider bar 140 into the first position 144 and disengage the plunger 88 from the post 22. When the thumbswitch 124 is released, the slider bar 140 moves to the second position 126 and engages the plunger 88 with the post 22.

In the manual release assembly 30, the plunger 88' of the locking mechanism 28' is manually manipulated. Referring to FIGS. 8–16, a knob supporting section 168 of plunger 88' extends from the disk 110 and has a diameter less than the disk 110, so that the disk 110 is located between the force-bearing section 106 and the knob supporting section 168. An endcap 132' is secured to projection 82' by two cap screws 134 that extend through endcap holes 136 in the endcap 132' and thread into cap screw holes 138 in the projection 82'. The knob supporting section 168 of the plunger 88' extends through a knob hole 169 in the top cap 50, and a knob 170 is attached to the distal end 84' of the plunger 88' extends extending outside of the projection 82'. A spring 174 disposed about the plunger 88' extends reacts between the disk 110 and the endeap 132, causing the plunger 88' extends to engage the post 22 until the knob 170 is pulled away from the tube 24 by manual manipulation.

In both embodiments, a bicycle seat 40 is mounted to the seat post assembly 20' using a seat clamp assembly 176 that attaches to the seat clamp mount 36. The seat post 22 is mounted to a bicycle 34 by attaching the tube 24 to the bicycle 34 in the same manner as an ordinary seat post 22. During this seat mounting process, the seat height 116 relative to the bicycle 34 is adjusted to be in a high position for optimal power, with the post 22 fully extended. After the seat is mounted, manipulation of the plunger 88, 88' to extend or distend the post 22 allows the seat to transition between a high position and a low position while the bicycle 34 is being ridden. During competitive mountain biking, for example, a rider can quickly lower the seat by operating the lever to unlatch the locking pin 88, 88' from the inner post 22 while maintaining sufficient body weight on the seat to overcome the constant upward force of the main spring 76. Once the inner post 22 begins to move downwardly, the rider can release the lever and the pin will drop into the uppermost hole of the inner post 22 to lock the inner post 22 in the lowered position. To return the seat to the fully raised condition, the lever is again actuated to unlatch the pin 88, 88' while the user lifts his body to decrease the counterweight on the seat by an amount sufficient to enable the main spring 76 to raise and return the inner post 22 to the fully raised position.

The invention further contemplates that the magnetic switch per se can be used apart from the seat post application in any of a number of other applications calling for a locking mechanism.

Obviously, many modifications and variations of the present invention are possible in light of the above teachings. The invention may be practiced otherwise than as specifically described within the scope of the claims. In addition, the reference numerals in the claims are merely for convenience and are not to be read in any way as limiting.

The invention claimed is:

1. An adjustable bicycle seat post assembly, comprising:
an outer seat tube having an open upper end and an opposite lower end insertable into a seat post receptacle of a bicycle frame;
an inner seat post having a lower end telescopically received in said open upper end of said outer seat tube and an opposite upper end adapted to mount a bicycle seat;
a spring housed within said outer seat tube and acting with a constant spring force between said outer seat tube and said inner seat post to constantly bias said inner seat tube axially outwardly of said outer seat tube toward a fully extended position;
a latch member carried by said outer seat tube and moveable between latched and unlatched positions; said latch member being engagable with said inner seat post when in said latched condition for selectively locking said inner seat post in a selected one of at least two positions of adjustment relative to said outer seat tube; and
a magnetic switch operative to move said latch members;
said magnetic switch including a pair of switch magnets of opposite polarity and a switch housing supporting said switch magnets for sliding movement relative to said latch member, and
wherein said latch member moves under the influence of changing magnetic field in response to moving said switch magnets.

2. The assembly of claim 1 wherein said latch member comprises a locking pin slidable along a pin axis between said latched and unlatch positions, and said switch magnets are moveable along an axis transverse to said pin axis.

3. The assembly of claim 2 wherein said switch magnets are moveable to a first position operative to magnetically repel said locking pin away from said switch magnets urging said locking pin toward said latched position.

4. The assembly of claim 3 wherein said switch magnets are moveable to a second position operative to magnetically attract said locking pin toward said switch magnets urging said locking pin toward said unlatched position.

5. The assembly of claim 4 wherein said locking pin mounts a pin magnet having a fixed polarity which is magnetically attracted to one of said switch magnets and is magnetically repelled by the other of said switch magnets.

6. The assembly of claim 5 wherein a slider shoe is moveable in a plane transverse to said pin axis to position one or the other of the switch magnets along said pin axis to either attract or repel said pin magnet.

7. The assembly of claim 6 including a push-pull cable coupled at one end to said switch housing and said slide shoe and an opposite end to a lever which is operative to move said slide shoe relative to said switch housing.

8. The assembly of claim 7 wherein said push-pull cable extends into said switch housing along an axis transverse to said pin axis.

\* \* \* \* \*